Aug. 22, 1961     H. BUCHANAN     2,997,103
SCREEN FOR MOTOR CAR WINDOWS
Filed July 16, 1959
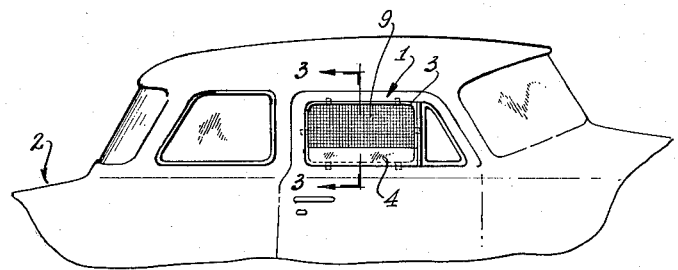
Fig. 1.
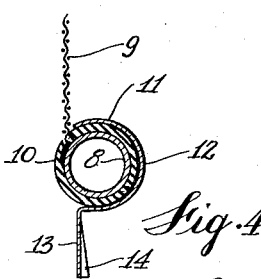
Fig. 5.
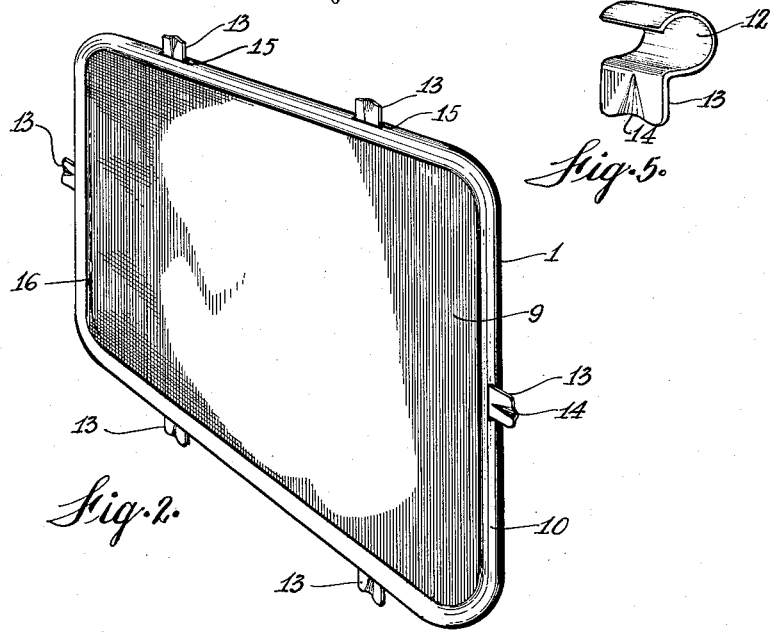
Fig. 2.
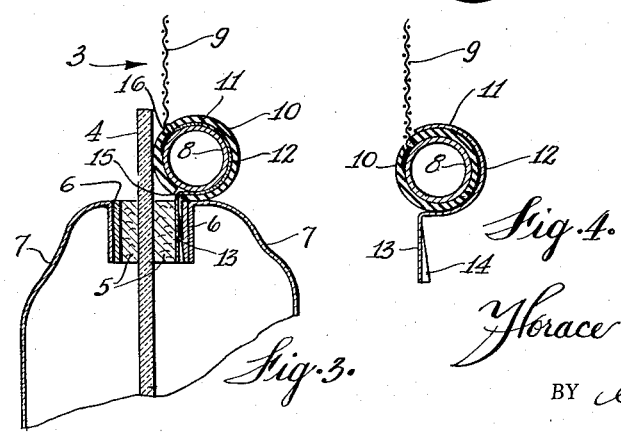
Fig. 4.
Fig. 3.
INVENTOR
Horace Buchanan
BY Alex. E. MacRae
ATTORNEY

United States Patent Office 2,997,103
Patented Aug. 22, 1961

2,997,103
SCREEN FOR MOTOR CAR WINDOWS
Horace Buchanan, 747 Tecumseh Road E.,
Windsor, Ontario, Canada
Filed July 16, 1959, Ser. No. 827,665
1 Claim. (Cl. 160—369)

This invention relates to screens for windows of motor vehicles.

It has frequently been proposed in the past to provide screens for motor car windows. However, such screens are not in widespread use largely because, it is believed, their structure is of a costly, complicated, impractical nature.

It is an object of this invention to provide a screen for motor car windows which is of simple, inexpensive manufacture, which may be readily and quickly mounted in a car window opening and removed therefrom, and which is effective and satisfactory in use.

The invention contemplates the provision of a screen having a tubular frame, a screen panel mounted in said frame in tangential relation thereto, a resilient covering substantially completely surrounding said tubular frame, and a plurality of clips each having a curved part embracing a portion of said frame and a mounting leg projecting outwardly from said frame.

The invention will be described with reference to the accompanying drawing, in which FIGURE 1 is a side elevation of a motor car having a screen in accordance with the invention installed therein, FIGURE 2 is a perspective view of a screen in accordance with the invention, FIGURE 3 is a partial sectional end elevation of the screen in installed position, FIGURE 4 is a partial section end elevation of the screen showing a modified clip mounting arrangement, and FIGURE 5 is a perspective view of a screen mounting clip.

In the drawing, 1 indicates the screen in accordance with the invention as installed in a conventional motor car 2 having a window opening 3 provided with a glass panel 4 which slides between felt or like strips 5 mounted by means of mouldings 6 in the car body members 7, all in usual manner.

The screen 1 comprises a frame 8 of a size and shape to correspond with the window opening 3. The frame is preferably composed of tubular metal of generally circular cross section as shown. A panel 9 of suitable metal or plastic composition screening has its edges fixed to the frame 8 as by soldering, welding or the like. It is important, for the purposes of the present invention, that the screen panel 9 extend tangentially from the tubular frame 8, as clearly shown in FIGURES 3 and 4, whereby one side of the panel is substantially unobstructed by the frame, i.e., the screen panel 9 lies in a plane which substantially coincides with the outermost plane of one side surface of the frame 8.

The frame 8 is provided with a covering layer 10 of resilient material such as rubber or plastic composition. It will be apparent that the layer 10 will project (substantially to the extent of its thickness) slightly beyond the plane of the screen panel 9 adjacent its line of attachment to the frame 8. The layer 10 is provided with a continuous opening or slit 16 for passage therethrough of the screen panel 9.

The screen 1 is installed on the inside of the window opening 3 by means of a plurality of clips 11. Each clip 11 has a part circular portion 12 arranged to snugly engage a portion of the tubular frame 8. The portion 12 preferably has an extent greater than a semi-circle whereby it embraces a major portion of the circumference of the frame 8. It will be apparent that the internal diameter of portion 12 is substantially equal to the external diameter of frame 8. As shown in FIGURE 3, the portion 12 of the clip is interposed between the frame 8 and covering layer 10. The clip 11 has a leg 13 which projects through an opening 15 in the layer 10. The leg 13 is arranged to be inserted between the moulding 6 and felt strip 5 on the inside of the window opening 3. The clip mounting described results in a secure retaining means for the clip while permitting it to revolve with respect to the frame to a limited extent due to the resiliency of the covering layer 10. Thus, positioning of the clips in position to install the screen may be conveniently accomplished.

The leg 13 of the clip may be provided with a rib 14 to assist its gripping engagement with moulding 6.

Referring particularly to FIGURE 3, it will be apparent that the screen described, when mounted on the inside of a window opening 3, permits up and down movement of the glass panel 4 in the usual manner. In other words, by reason of the formation of the screen 1 and its mounting as described, there is no interference with the normal functioning of the window. It is important to note that the screen 1 is positioned with its frame 8 projecting inwardly of the window opening, i.e., with the unobstructed side of the screen panel 9 in adjacent relation to the glass panel 4, the panels 4 and 9 being maintained in spaced relation by the intervening thickness of the covering layer 10. Thus, the screen, by reason of the particular clip mounting means described, may be easily and quickly installed in or removed from the window opening.

Any suitable number of clips may be employed to install the screen. As shown, in the example illustrated two clips are employed on each of the top and bottom sections of the frame, and one each on the end sections of the frame.

Each clip 11 may be readily applied to the frame 8 by inserting it through the layer slit 16 with leg 13 projecting through an opening 15 and clipping its arcuate portion 12 over the frame.

The screen may be installed in the window opening by positioning the screen minus attaching clips 11 in the opening and then applying each clip in turn by inserting it through slit 16 with leg 13 projecting through opening 15 and inserted between moulding 6 and felt strip 5 at the appropriate locations and finally clipping its arcuate portion 12 over frame 8.

It will be apparent that, when the glass panel 4 is raised to about half closed position, it is substantially impossible to remove the screen from the outside of the vehicle.

FIGURE 4 illustrates a modification wherein the clip 11 has its curved portion 12 applied to the external surface of covering layer 10. Such an arrangement is possible because such portion 12 has a curvature exceeding a semi-circle. If desired both arrangements of clips as described may be used in the installation of a single screen.

There has thus been described a screen for motor vehicles which may be manufactured in a very inexpensive manner, which may be installed in a window opening without any disfigurement or change in the existing vehicle structure, and which is effective without disturbance of normal functioning of the window.

I claim:

A screen for motor vehicle windows comprising a tubular metal frame, a screen panel having its edges fixed to one side of said frame throughout its extent, said panel thereby having one side thereof lying in a plane unobstructed by said frame, a resilient layer substantially completely surrounding said frame and projecting slightly outwardly of said plane, and a plurality of clips each having a portion embracing a portion of said frame and interposed between said frame and said layer, and a mounting leg projecting outwardly from said frame through said layer, each said clip being movable with respect to said frame and being retained in position thereon by said layer.

References Cited in the file of this patent

UNITED STATES PATENTS

| | | |
|---|---|---|
| 1,702,395 | Anderson | Feb. 19, 1929 |
| 2,116,261 | Fogelberg | May 3, 1938 |
| 2,388,747 | Kolarik | Nov. 13, 1945 |
| 2,491,707 | Boyden | Dec. 20, 1949 |
| 2,576,777 | Clements | Nov. 27, 1951 |
| 2,596,438 | Rollings | May 13, 1952 |
| 2,760,568 | Smiraldo | Aug. 28, 1956 |
| 2,805,712 | McVicher | Sept. 10, 1957 |